(12) United States Patent
Boykin et al.

(10) Patent No.: US 8,775,962 B2
(45) Date of Patent: Jul. 8, 2014

(54) STEP-WISE, CUMULATIVE OBJECT AND RELATIONSHIP AGGREGATION IN A GRAPHICAL SYSTEM MANAGEMENT TOPOLOGY

(75) Inventors: J. Russell Boykin, Pflugerville, TX (US); Alberto Giammaria, Austin, TX (US); Patricia Diana Griffin, Austin, TX (US); Christopher Andrew Peters, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1074 days.

(21) Appl. No.: 12/612,224

(22) Filed: Nov. 4, 2009

(65) Prior Publication Data

US 2011/0107250 A1    May 5, 2011

(51) Int. Cl.
*G06F 3/048* (2013.01)
(52) U.S. Cl.
USPC ............ 715/772; 715/712; 715/713; 715/719
(58) Field of Classification Search
USPC .................................. 715/713, 712, 719, 772
See application file for complete search history.

(56) References Cited

U.S. PATENT DOCUMENTS

| | | |
|---|---|---|
| 5,276,789 A | 1/1994 | Besaw et al. |
| 5,295,244 A | 3/1994 | Dev et al. |
| 5,436,909 A | 7/1995 | Dev et al. |
| 6,075,530 A | 6/2000 | Lucas et al. |
| 6,532,471 B1 | 3/2003 | Ku et al. |
| 6,829,615 B2 | 12/2004 | Goodwin et al. |
| 6,938,219 B2 | 8/2005 | Al-Azzawe et al. |
| 2005/0039139 A1 | 2/2005 | Schwartz et al. |
| 2007/0171716 A1 | 7/2007 | Wright et al. |
| 2007/0277111 A1 | 11/2007 | Bennett et al. |

OTHER PUBLICATIONS

Wikipedia, "Dropbox (service)," Oct. 2009.*
Hochheiser et al., Coordinating Overviews and Detail Views of WWW Log Data, pp. 1-6, retrieved Oct. 25, 2008 http://hcil.cs.umd.edu/trs/2000-25/2000-25.html.
"Topology Services", User Guide for Campus Manager 4.0, Chapter 8, Cisco Systems, 2005, pp. 1-72.
Yurcik, "Visualizing Netflows for Security at Line Speed: The SIFT Tool Suite", 2005, Proceedings of LISA'05: Nineteenth Systems Administration Conference, San Diego, CA USENIX Association Dec. 2005, pp. 1-13.

* cited by examiner

*Primary Examiner* — Robert Stevens
*Assistant Examiner* — Daniel Um
(74) *Attorney, Agent, or Firm* — Yee & Associates, P.C.; Jeffrey S. LaBaw

(57) ABSTRACT

A graphical user interface (GUI) in which a user may navigate through states of an information technology (IT) management process by selecting or deselecting the selectable objects in the GUI. When the user selects a first object in a first display window of the GUI, the first display window is changed to represent a first state of the IT management process based on the selected object, and the second display window is changed to show computing objects and relationships associated with the selected object. When the user selects another associated object in the first display window, the first display window is changed to represent a second state of the IT management process based on the selected object, and the and the second display window is changed to show computing objects and relationships associated with the selected object.

20 Claims, 12 Drawing Sheets

STEP-WISE, CUMULATIVE OBJECT AND RELATIONSHIP AGGREGATION IN A GRAPHICAL SYSTEM MANAGEMENT TOPOLOGY

BACKGROUND

1. Field

The embodiments of the disclosure relate generally to the data processing field and, more specifically, to a computer implemented method, apparatus and computer program product for displaying objects and relationships in a distributed computing environment.

2. Description of the Related Art

The scope of object and relationship displays in a typical enterprise environment can quickly become large and unwieldy. As a result, it is often desired to filter a display of objects and relationships using various algorithms, depending on the needs of a user of the display. For example, a user may wish to display objects and relationships appearing within the boundaries of a particular area using pan/zoom methods; or filter a display based on specific object/relationship types using regular expression matching, logical operations, etc. Traditional filtering methods such as these may be useful when a filtering action results in a display containing a manageable number of objects and object/relationship mappings.

There are, however, categories of objects and relationships for which traditional filtering methods are not adequate. For example, filtering may result in an object and relationship set that is too large and/or too complex to display in a visually meaningful way. Similarly, a filtered set that represents accumulations of changes over time may lose the time-based context when its objects and relationships are viewed all at once. For such a category of objects, a more sophisticated filtering method is needed.

Filtering mechanisms that filter by type, location, etc. are established and well-known. Examples of recent advances in filtering include perspective-based filtering, VMware™ maps, Windows™ Explorer and Google™ Maps. In perspective-based filtering, objects and relationships are filtered, organized and displayed according to a selected perspective. Examples of perspective-based filtering include the Java Debugging, and Synchronization perspectives of the Eclipse™ IDE. Perspective-based filtering is useful for organizing data according to the "perspective" of the user, usually based on a current role and job function being performed. Perspectives are comprised of customized data views, and do not, in and of themselves, describe a formal mechanism for data filtering and relationship mapping within the perspective.

The Maps feature of VMware™ Virtual Center Client provides a filtering mechanism in which objects and relationships can be added in a cumulative fashion, but only from a root node. FIGS. 1A and 1B are diagrams that schematically illustrate the Maps feature of VMware™ Virtual Center Client to assist in explaining illustrative embodiments. FIG. 1A illustrates the relationship of host 110 to a plurality of objects, for example, virtual machines (VMs) 120 in a Maps feature filtering mechanism of a VMware™ Virtual Center Client, and FIG. 1B illustrates the addition of data stores 130 (further objects) to the relationship of FIG. 1A.

As is apparent from FIGS. 1A and 1B, objects/relationships are added only from a primary node, the primary node being the host 110. In addition, the objects themselves cannot be selected to expand the associated relationships. The relationship choices are fixed, limited, and only available for selection outside of the graphical object model.

Windows™ Explorer provides a hierarchical view of objects (i.e., folders), that can be incrementally traversed, with associated relationships (i.e., files contained in the folders) displayed at each traversal step. The objects and relationships in Windows™ Explorer are represented in a single tree view. Each display state change results in one type of relationship ("contains") and two types of objects (i.e., files and folders). Because there is only one view, there is a limit to the number of types of objects and relationships that can be easily shown.

FIG. 2 is a diagram that illustrates a Google™ map filtering mechanism to assist in explaining illustrative embodiments. In Google™ maps, the selection of a result in the "Search Results" view triggers a pop-up in a map such as city map 200 in FIG. 2. The pop-up 210 contains details 212 (properties) of the selected item (Eddie V's Edgewater Grille) and a list of actions 214 that are associated with the selected item. The pop-up 210 does not, however, represent the set of objects illustrated in the pop-up related to the selected object (Eddie V's Edgewater Grille), with an ability to subsequently select the related objects in order to perform further relationship mappings.

SUMMARY

According to one embodiment of the disclosure, a computer implemented method, apparatus and computer program product for iteratively displaying and changing a display in a graphical user interface for a distributed computing environment to navigate through states of an information technology management process is provided. A method for displaying a graphical user interface for a distributed computing environment includes displaying computing objects and relationships between respective ones of the computing objects in the distributed computing environment in a graphical user interface on a computer, wherein a plurality of selectable objects are displayed in a display in a first display window of the graphical user interface, and the computing objects and relationships are displayed in a display in a second display window of the graphical user interface, and wherein a user navigates through states of an information technology management process displayed in the graphical user interface by selecting or deselecting the selectable objects in the first display window. Responsive to selection of an object of the plurality of selectable objects displayed in the first display window, changing the display in the first display window to represent a first state of the information technology management process based on the selected object, wherein the first display window includes a first set of associated selectable objects associated with the selected object, and changing the display in the second display window to show the selected object and computing objects and relationships associated with the selected object. Responsive to selection of an associated selectable object of the first set of associated selectable objects, changing the display in the first display window to represent a transition to a second state of the information technology management process, wherein the first display window includes a second set of associated selectable objects associated with the selected associated object of the first set of associated objects and changing the display in the second display window to show the selected associated object and computing objects and relationships associated with the selected associated object of the first set of associated selectable objects. The selection of subsequent objects in the first display window is an iterative process which can change the display state as many times as needed, as the number of objects that become available for selection in the first display window is only limited by the number of states in the process.

BRIEF DESCRIPTION OF THE SEVERAL VIEWS OF THE DRAWINGS

FIG. 1A illustrates the relationship of a host to virtual machines in a Maps feature filtering mechanism of a VMware™ Virtual Center Client, and FIG. 1B illustrates the addition of data stores to the relationship of FIG. 1A.

FIG. 7A is illustrates a first step of the method, FIG. 7B illustrates a second step of the method, FIG. 7C illustrates a third step of the method, and FIG. 7D illustrates a fourth step of the method.

DETAILED DESCRIPTION

Figure 1A:
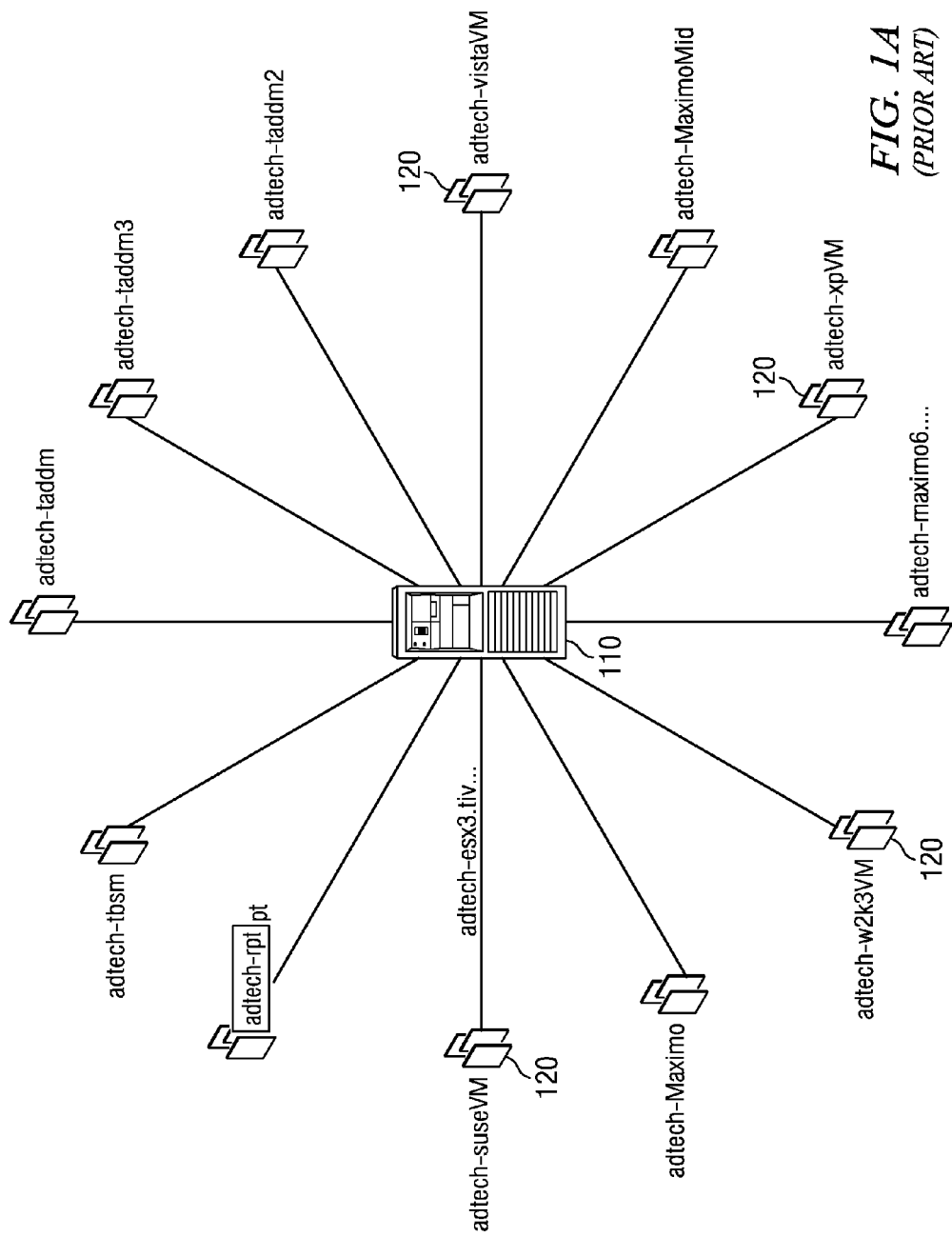
FIGS. 1A and 1B are diagrams that schematically illustrate the Maps feature of VMware™ Virtual Center Client to assist in explaining illustrative embodiments.
Figure 1B:
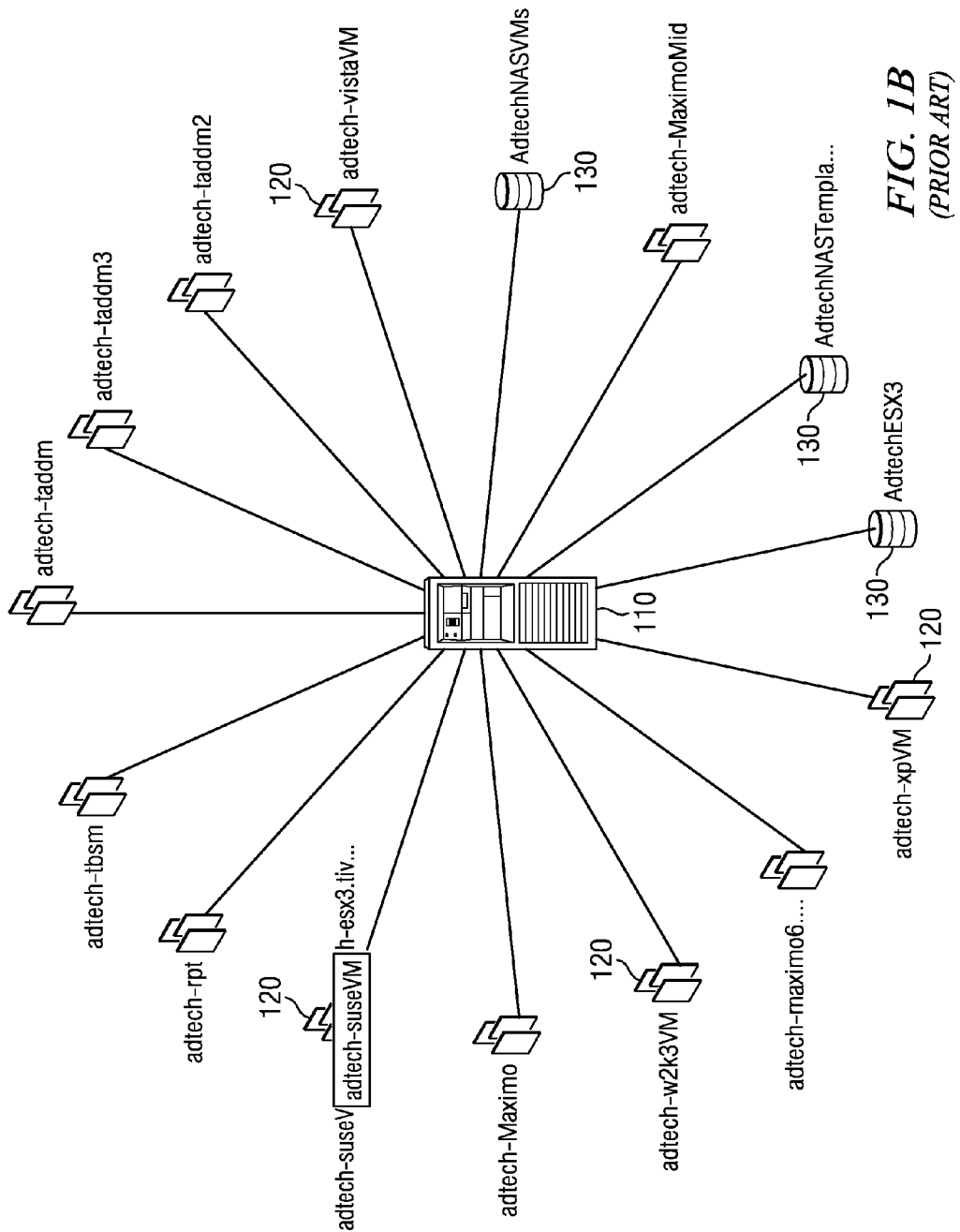
Figure 2:
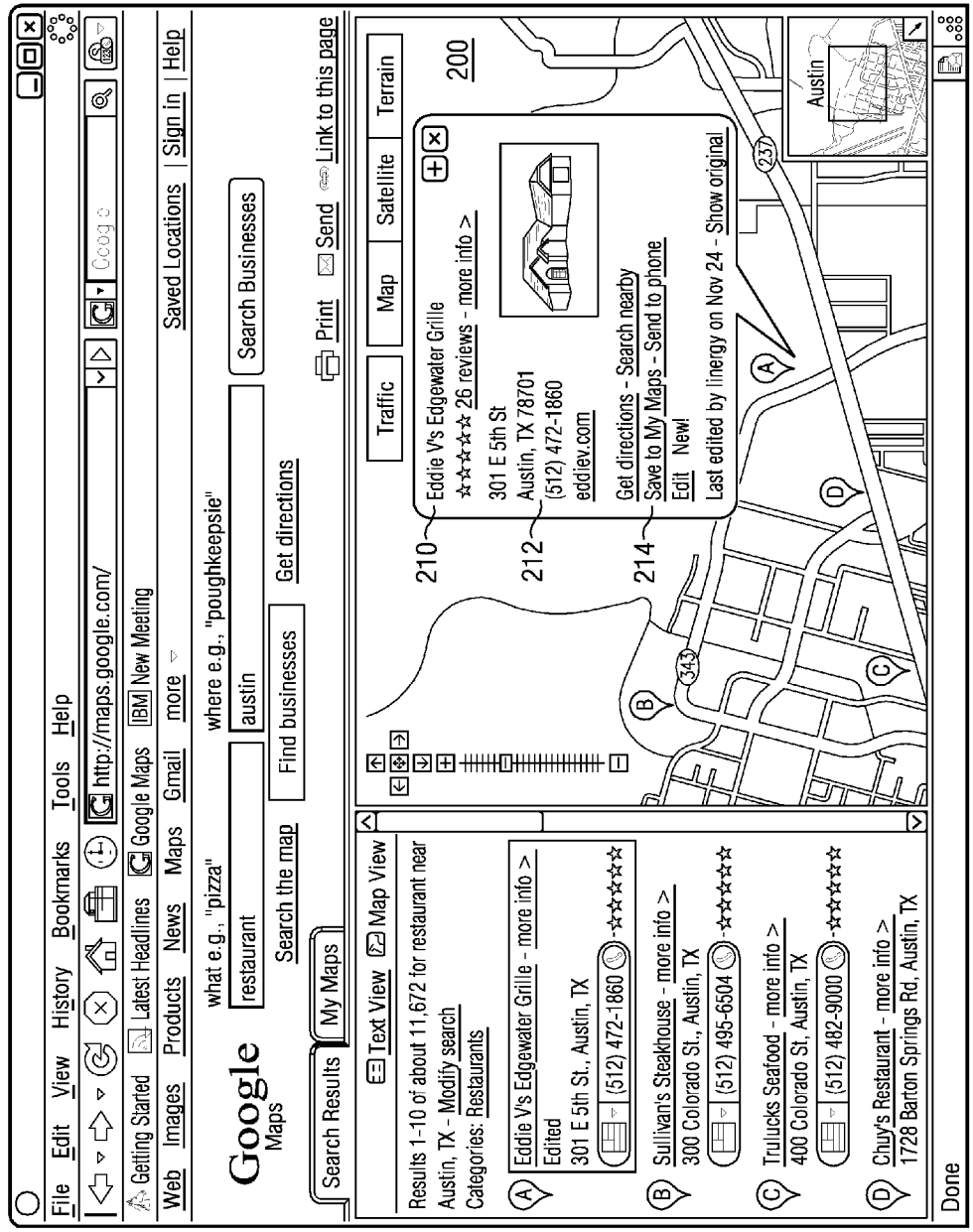
FIG. 2 is a diagram that illustrates a Google™ map filtering mechanism to assist in explaining illustrative embodiments.

As will be appreciated by one skilled in the art, the disclosure may be embodied as a system, method or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments of the disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 3:
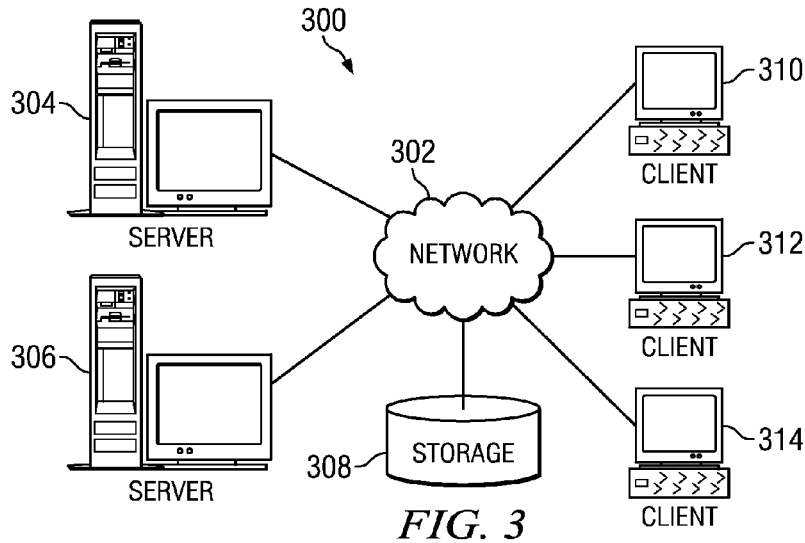
FIG. 3 depicts a pictorial representation of a network of data processing systems in which illustrative embodiments may be implemented.
Figure 4:
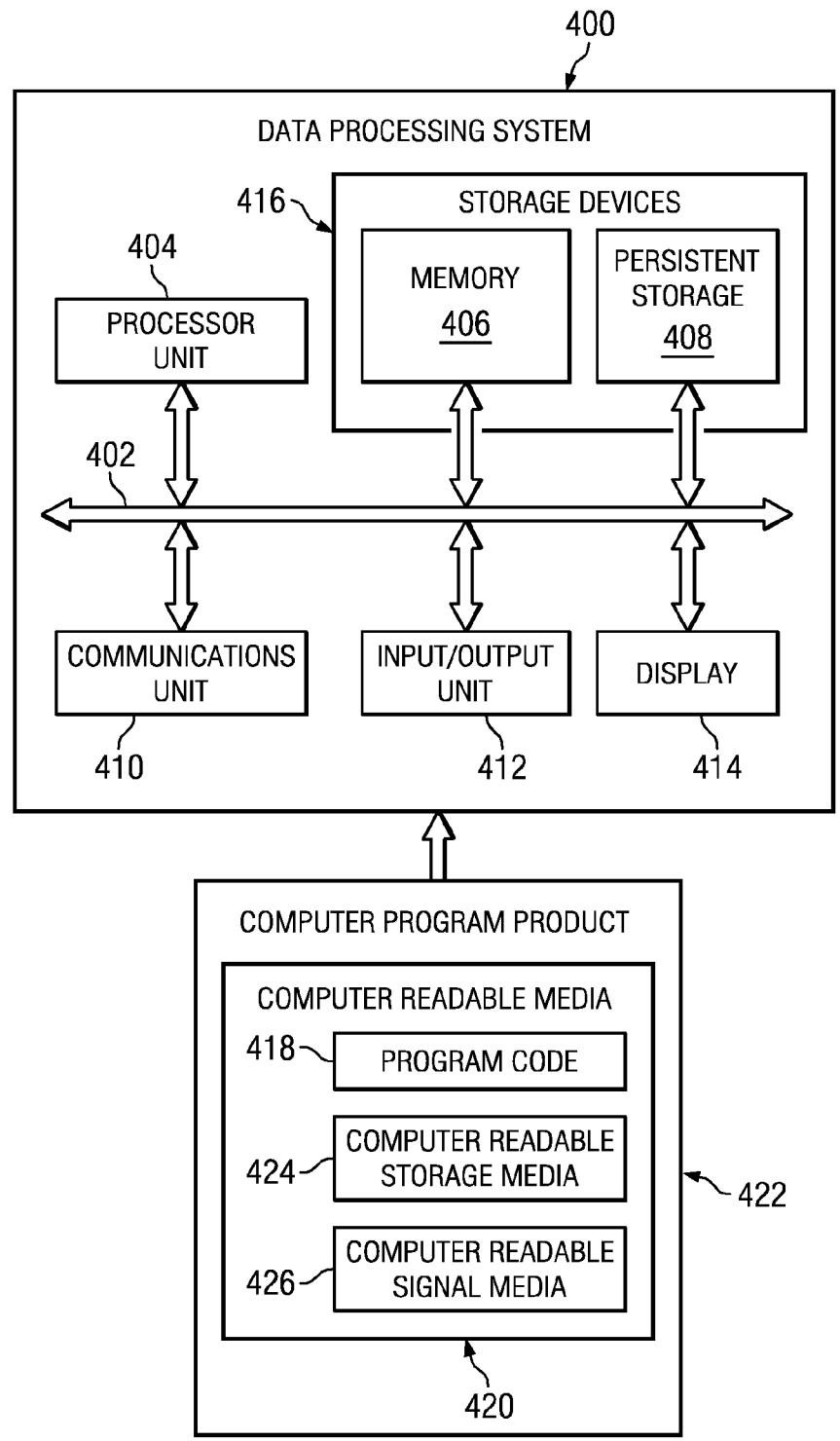
FIG. 4 depicts a block diagram of a data processing system in which illustrative embodiments may be implemented.

With reference now to the figures and in particular with reference to FIGS. 3-4, exemplary diagrams of data processing environments are provided in which illustrative embodiments may be implemented. It should be appreciated that FIGS. 3-4 are only exemplary and are not intended to assert or imply any limitation with regard to the environments in which different embodiments may be implemented. Many modifications to the depicted environments may be made.

FIG. 3 depicts a pictorial representation of a network of data processing systems in which illustrative embodiments may be implemented. Network data processing system 300 is a network of computers in which the illustrative embodiments may be implemented. Network data processing system 300 contains network 302, which is the medium used to provide communications links between various devices and computers connected together within network data processing system 300. Network 302 may include connections, such as wire, wireless communication links, or fiber optic cables.

In the depicted example, server 304 and server 306 connect to network 302 along with storage unit 308. In addition, clients 310, 312, and 314 connect to network 302. Clients 310, 312, and 314 may be, for example, personal computers or network computers. In the depicted example, server 304 provides information, such as boot files, operating system images, and applications to clients 310, 312, and 314. Clients 310, 312, and 314 are clients to server 304 in this example. Network data processing system 300 may include additional servers, clients, and other devices not shown.

Program code located in network data processing system 300 may be stored on a computer recordable storage medium and downloaded to a data processing system or other device for use. For example, program code may be stored on a computer recordable storage medium on server 304 and downloaded to client 310 over network 302 for use on client 310.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 300 also may be implemented as a number of different types of networks, such as for example, an intranet, a local area network (LAN), or a wide area network (WAN). FIG. 3 is intended as an example, and not as an architectural limitation for the different illustrative embodiments.

With reference now to FIG. 4, a diagram of a data processing system is depicted in accordance with an illustrative embodiment. Data processing system 400 is an example of a computer, such as server 304 or client 310 in FIG. 3, in which computer usable program code or instructions implementing the processes may be located for the illustrative embodiments. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The illustrative embodiments provide a computer implemented method, system and computer usable program code for displaying a graphical user interface for a distributed computing environment. The illustrative embodiments provide an iterative process for filtering and displaying computing objects and relationships based on step-wise accumulations to a current display state to form a statewise, cumulative display. For every display state there is a transition to a subsequent display state, depending on the current view context, which determines the computing objects and relationships to be added and/or removed from the current display. The illustrative embodiments make it possible to display thousands of computing objects and their relationships with other computing objects in the current display. The subsequent display states are only limited by the number of states in the process.

Figure 5:
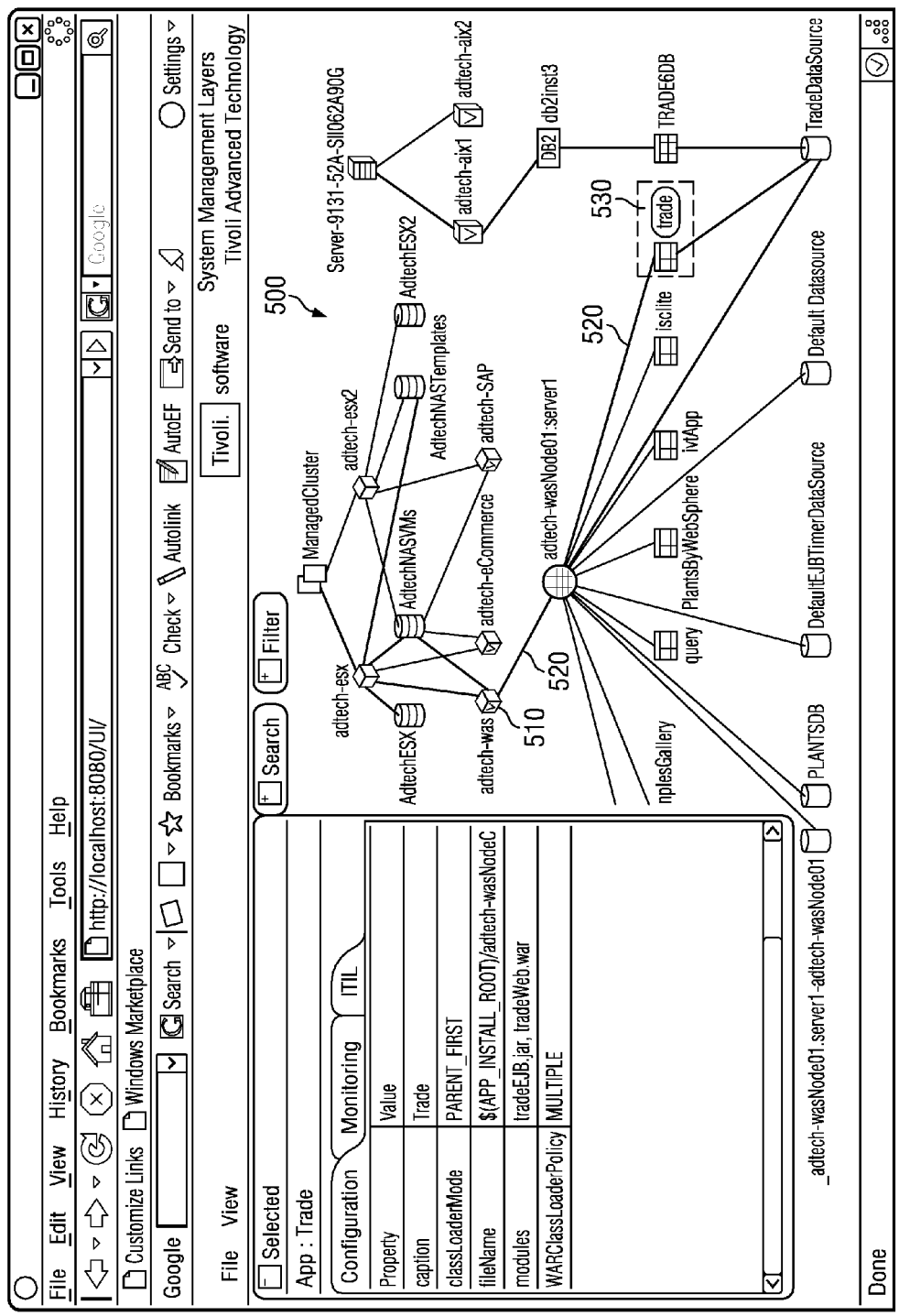
FIG. 5 is a diagram that schematically illustrates a traditional initial view of computing objects and relationships that directly or indirectly relate to an application being diagnosed in a distributed data processing system to assist in explaining illustrative embodiments.

An example of a possible candidate for a statewise, cumulative display is a view involving the movement of data through states of a process. Consider, for example, that a root cause analysis is being performed to diagnose a particular problem in an enterprise, such as an application performance problem. As a staring point, FIG. 5 is a diagram that schematically illustrates a traditional initial view of computing objects and relationships that directly or indirectly relate to an application being diagnosed in a distributed data processing system to assist in explaining illustrative embodiments. In particular, FIG. 5 schematically illustrates a traditional initial view 500 of objects, for example, computing object 510, and relationships, for example, relationships illustrated by lines 520, that directly or indirectly relate to an application (Trade 530) being diagnosed in a distributed data processing system.

Figure 6:
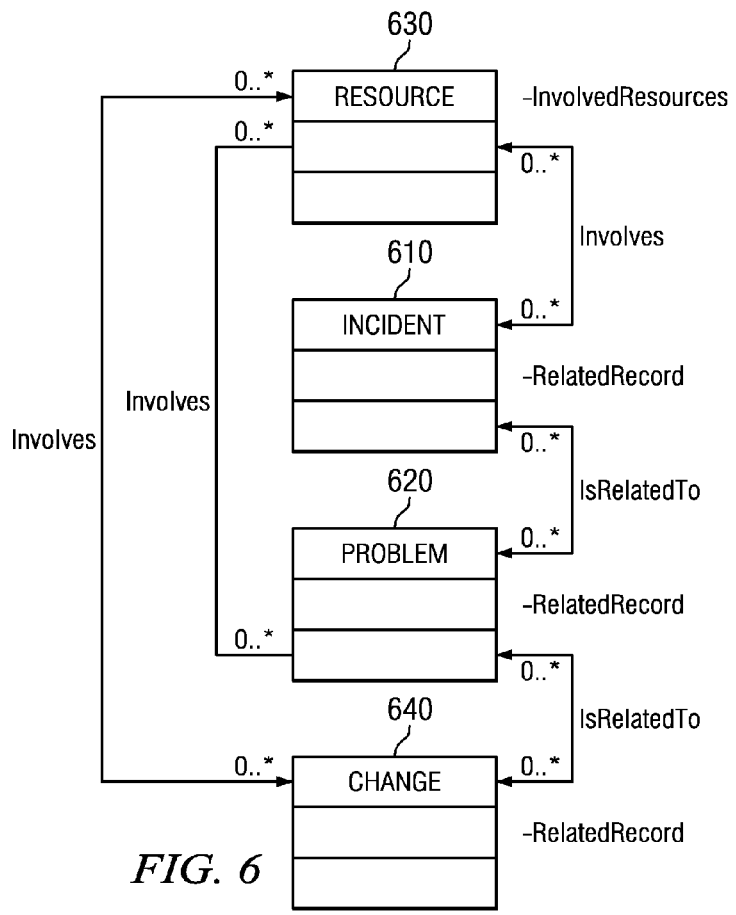
FIG. 6 is an object relationship diagram that schematically illustrates the relationships between objects (e.g., resources, incidents, problems and changes) relating to an application being diagnosed in a distributed data processing system.

Suppose that it is desired to view historical Service Desk workflow data to identify previous problems and subsequent resolutions reported for an application, as well as to see the computing objects (computer systems, servers, etc.) affected by traversal through the Service Desk workflow process. Clearly, there can be thousands of Service Desk records and associated objects reported for a given application over time. FIG. 6 is an object relationship diagram that schematically illustrates the relationships between objects (e.g., resources, incidents, problems and changes) relating to an application being diagnosed, for example, application 530 in FIG. 5.

As shown in FIG. 6, an incident 610 is related to (caused by) a problem 620 and involves resource 630. The problem 620 also involves resource 630. Change 640 is related to the problem 620, and also involves resource 630. In FIG. 6, each "0" means "0 or more occurrences of", and this shows how items can proliferate into an unwieldy number of objects, since most of the objects can be related to 0 or more other objects.

Figure 7A:
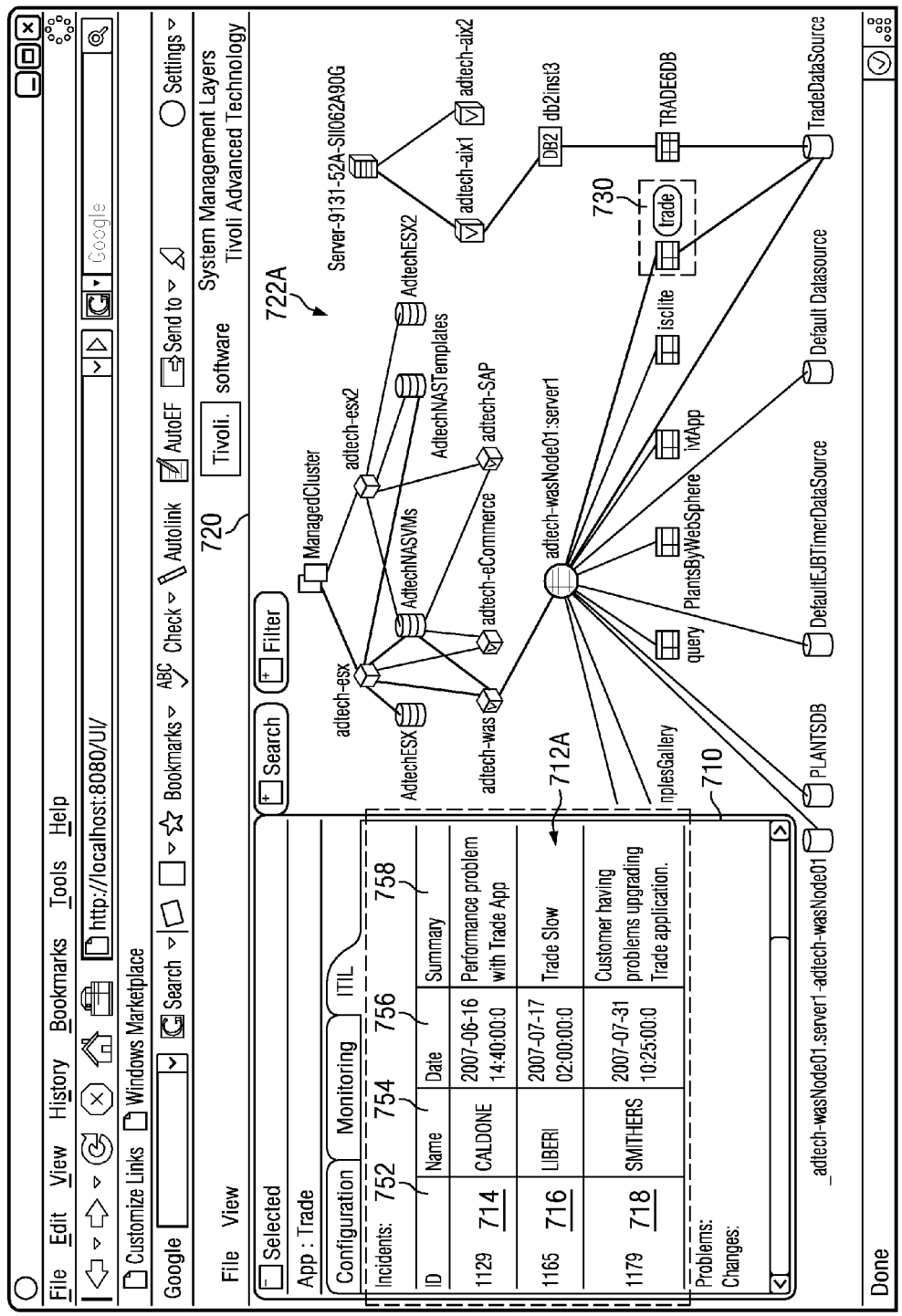
FIGS. 7A-7D are diagrams that schematically illustrate steps of a method for displaying a graphical user interface for a distributed computing environment according to an illustrative embodiment.

Rather than using a method that locates all of the process records and shows the aggregation of the computing objects and the relationships involved, the data can be displayed in a step-wise, additive fashion, wherein objects are selected and data is subsequently displayed in an iterative manner. FIGS. 7A-7D are diagrams that schematically illustrate a method for displaying a graphical user interface for a distributed computing environment according to an illustrative embodiment. FIG. 7A illustrates a first step of the method. As shown in FIG. 7A, display 700 includes first display window 710 and second display window 720. Upon selecting an application 730 to be diagnosed (designated "Trade"), the traditional initial view of computing objects and relationships that directly or indirectly relate to the application being diagnosed is displayed in second display window 720 as display 722A. At the same time, a list of incidents associated with the selected application that are logged with the Service Desk is displayed in a list 712A in first display window 710. As shown in FIG. 7A, list 712A identifies three incidents 714, 716 and 718 associated with application 730 and includes, for each incident, an ID number 752, a name 754 for the incident, the date the incident occurred 756, and a brief summary of the incident 758.

Figure 7B:
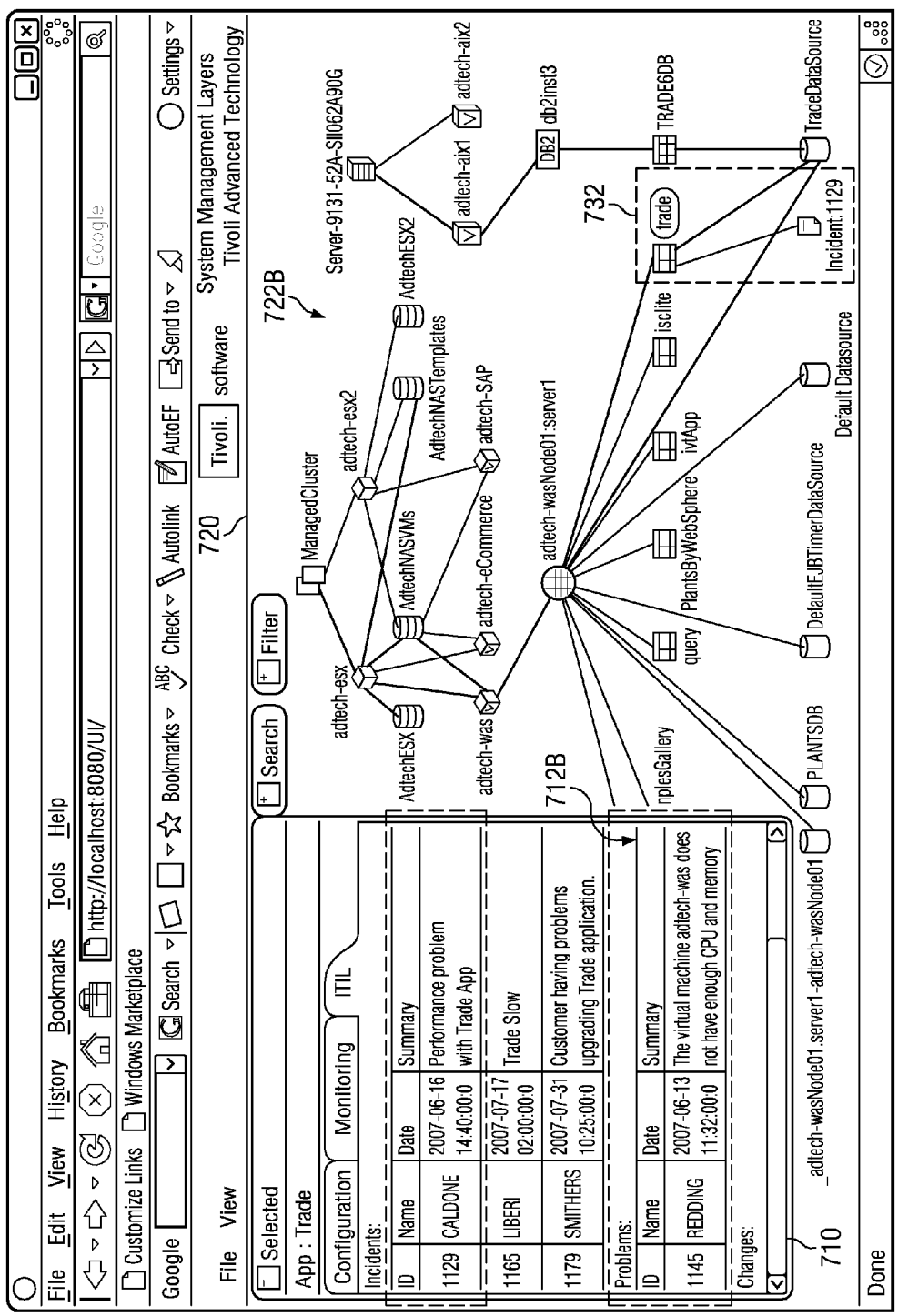

The user then selects a particular incident from the list of incidents 712A in FIG. 7A. Upon making the selection (in the illustrative embodiment, incident 714 named CALDONE is selected), as illustrated in FIG. 7B, the display in the second display window 720 is updated to show, in display 722B, the selected incident and its relationships to the application, as reflected in area 732, as well as other computing objects that are associated with the incident. Concurrently, a list of problem records related to the incident is displayed in an expanded display 712B in the first display window 710.

Figure 7C:
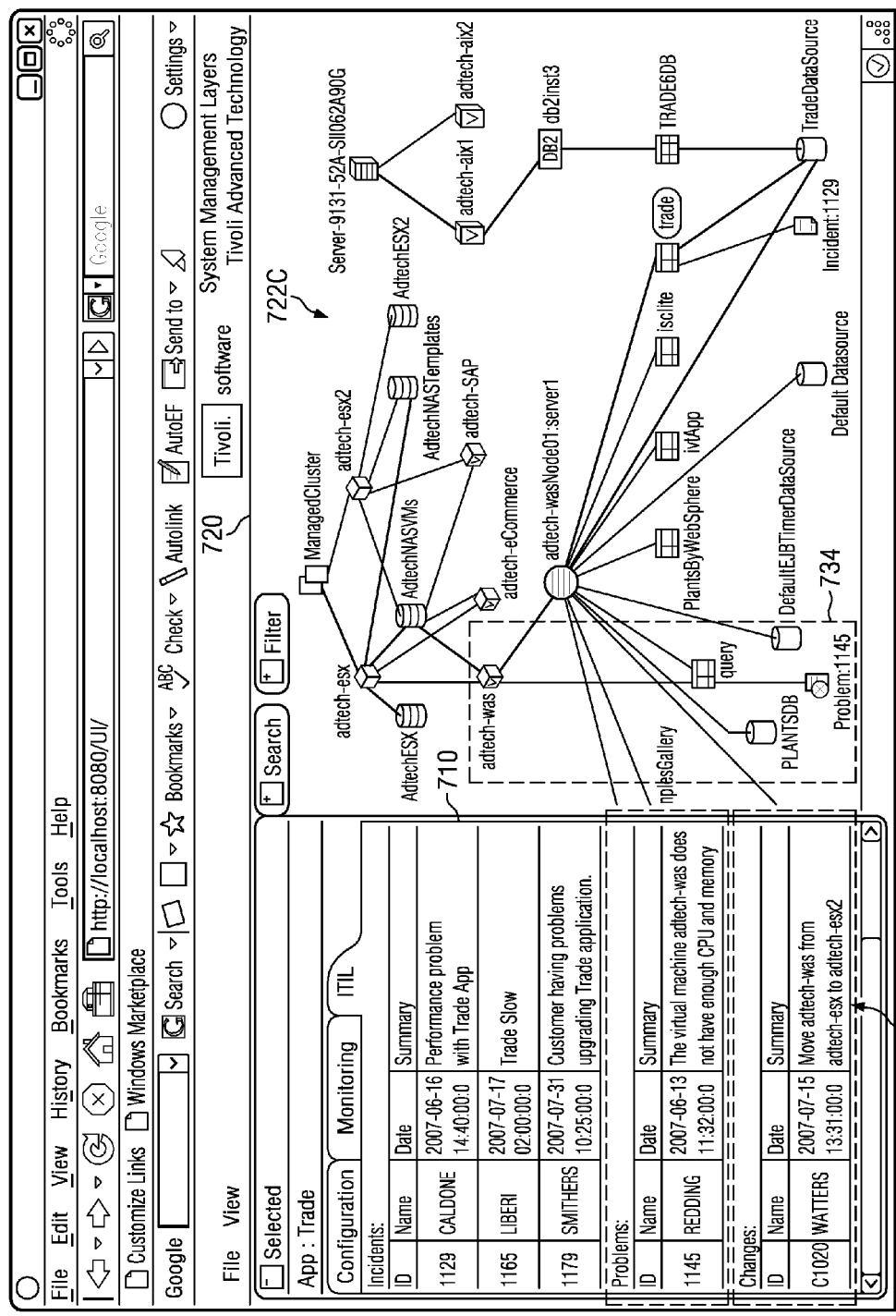

The user then selects a particular problem for the selected incident. Upon selecting a particular problem for the selected incident, as shown in FIG. 7C, the display 722C in the second display window 720 is updated with the selected problem and its relationships to associated computing objects (in the illustrative example, the problem was related to the adtech-was virtual machine), as reflected in area 734. Concurrently, a list of changes for the selected problem is displayed in a further expanded display 712C in the first display window 710. It is to be noted that the resulting display 722C is cumulative but is bounded, i.e., the display will still be within the context of the initial application and the selected incident.

Figure 7D:
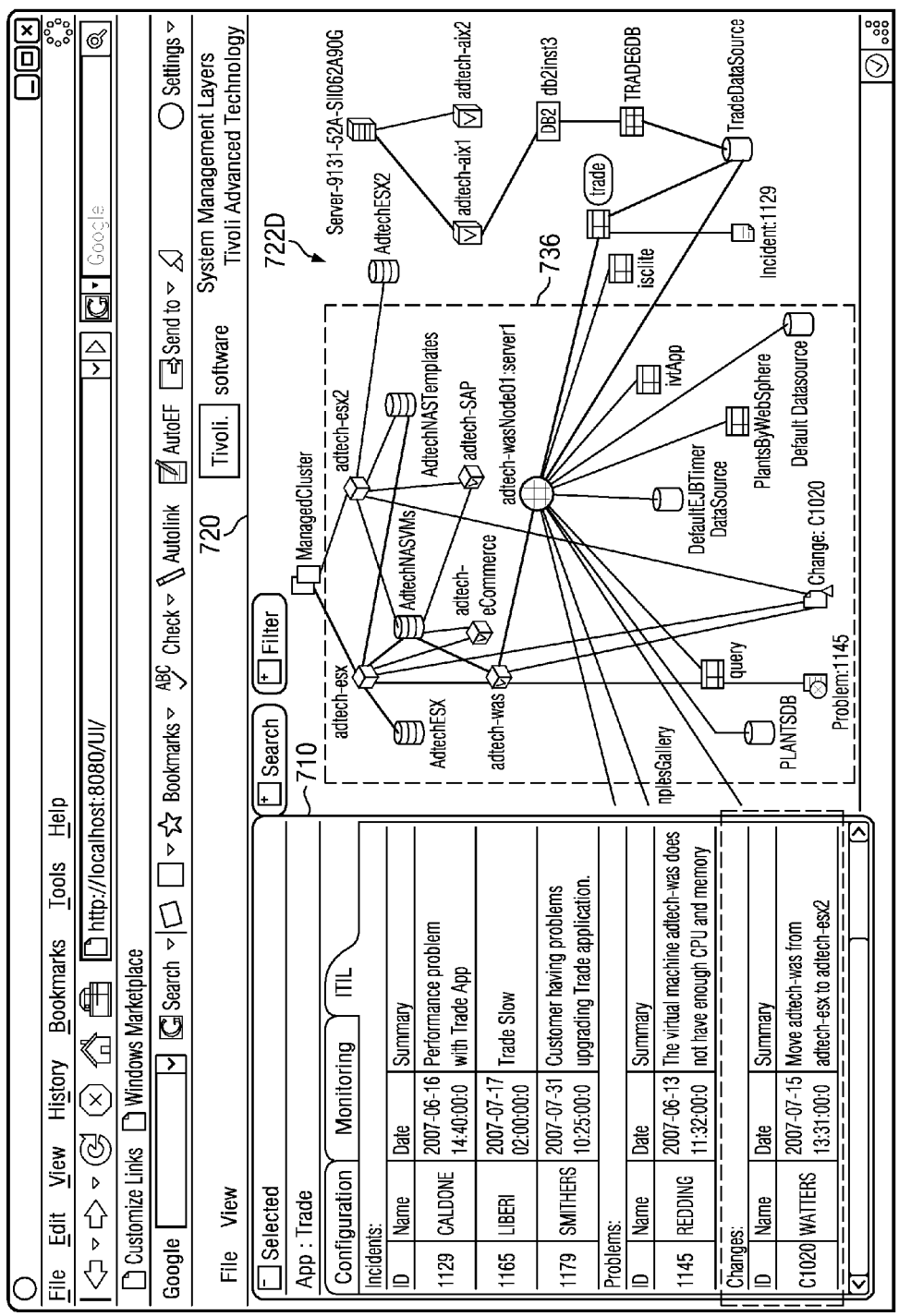

Then, the user selects a change for the particular problem. Upon selecting the change, the display is again updated as shown in FIG. 7D. In particular, the display 722D in second display window 720 is updated with the selected change and its relationship to associated computing objects as reflected in area 736 (in the illustrative example, the adtech-was virtual machine was moved from the adtech-esx server to the adtech-esx2 server, so relationships to all three computing objects are displayed in display 722D). Again, the resulting display 722D is cumulative but bounded; we are still within the context of the initial application, selected incident, and selected problem.

Although the particular examples in FIGS. 7A-7D illustrate a limited number of selectable objects of incidents, problems, and changes, it should be noted that in a real-world scenario, the number of selectable objects may differ in magnitude from the illustrative examples shown above. Consequently, the illustrative embodiments are not limited to the particular selectable objects shown, but may be extended to include any number of objects for selection to diagnose performance problems of a computing object, as well as including various other types of objects for selection. Furthermore, although, in the illustrative embodiment, the plurality of objects to be displayed comprise applications being diagnosed in a distributed data processing system, and associated objects include incidents associated with a selected application, problems associated with the incidents and changes associated with the problems, it should be understood that this is intended to be exemplary only. Other types of objects in the same domain that may be displayed may include, for example, releases. Other types of objects in another domain may comprise a transaction model (e.g., bank transactions) in which the first transaction "node" (with its identification information) is selected in the first display window, at which time the next node(s) in the transaction flow, also in the first display window, are displayed and selectable. The second display window may display the computing resources and relationships (e.g., servers, OSs, databases, etc.) involved in the transaction processing at the selected node. Subsequent selections from the first display window of nodes occurring later in the transaction flow may either add or remove associated resources and relationships from the second display window. Moreover, while a particular number of iterations of the object selection and display process are described (e.g., incident objects to problem objects to change objects), the process in the illustrative embodiments may be implemented in an iterative manner that is only bound by the number of states in the process. Consequently, the set of selectable objects displayed in the first display window and the view displayed in the second display window may be iteratively changed.

Selection in a cumulative view can also result in removal of computing objects and relationships from the view currently being displayed in the second display window. For example, if another problem is selected for the incident above, all computing objects and relationships associated with the original problem and change are removed from the views, and new computing objects and relationships associated with the new problem are added to the views. No computing objects or relationships associated with a change are displayed since a change is not yet selected for this state. We are still bounded by the context of the original incident, however, so the computing objects and relationships for the incident remain.

Figure 8A:
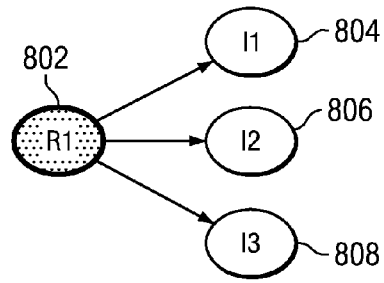
FIG. 8A-8D are diagrams that schematically illustrate how selection and/or deselection of objects results in the addition or removal of objects in the graphical user interface in accordance with the illustrative embodiments.

FIG. 8A-8D are diagrams that schematically illustrate how selection and/or deselection of objects results in the addition or removal of objects in the graphical user interface in accordance with the illustrative embodiments. In contrast with systems that provide hierarchical, drill-down models for object selection, the selection and deselection of objects in the display in the illustrative embodiments provide a statewise, relationship-centric model, where objects displayed represent current Incident/Problem/Change/Resource states of a process based on the current object selections, and transitions between states of the process are reflected by the changed content of the display windows. For instance, FIGS. 8A-8D show how the Incident/Problem/Change/Resource process states may change based on the selection or deselection of objects in the display. For example, FIG. 8A illustrates a first step comprising selection of a particular resource, such as Resource object R1 802. An example of a Resource object is Trade application 730 in FIG. 7A. Selecting Resource object R1 802 displays a list of incidents related to the selected Resource object R1 802 in the first display window. In this example, list of related incidents in Incident objects I1 804, I2 806, and I3 808.

Figure 8B:
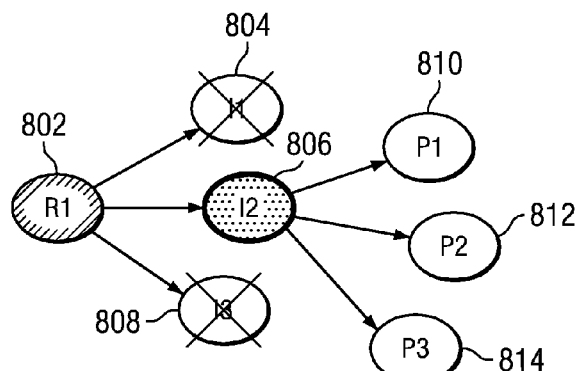

FIG. 8B illustrates a second step comprising selection of an Incident related to Resource R1 802, such as Incident object I2 806. Selection of Incident object I2 806 displays the first state of objects and relationships related to Incident object I2 806 in the first display window, and removes objects not related to Incident object I2 806 from the display window. In this example, Problem objects P1 810, P2 812, and P3 814 are shown to comprise the first state of objects and relationships related to Incident objects I2 806. The diagram represents not only relationship changes, but a transition from the process state in FIG. 8A to a new process state in FIG. 8B. The state in FIG. 8B represents a step in the Information Technology Infrastructure Library (ITIL) process in which problem records have been issued for Incident object I2 806 related to Resource object R1 802, but change records have not yet been issued. Note that Incident objects I1 804 and I3 808 are not a part of the currently displayed state for selected Incident object I2 806, although these Incident objects remain in the list in the first display window for selection purposes.

Figure 8C:
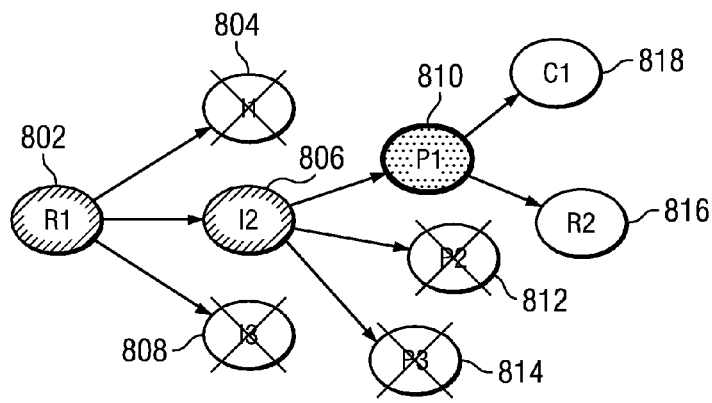

FIG. 8C illustrates a third step comprising selection of a Problem related to Incident I2 806, such as Problem object P1 810. Selection of Problem object P1 810 displays the first state of objects and relationships related to Problem object P1 810, and removes objects not related to Problem object P1 810. It should be noted that the objects displayed are still bounded within the context of Incident object I2 806. The diagram represents relationship changes in addition to a transition from the process state in FIG. 8B to a new process state in FIG. 8C. The state in FIG. 8C represents a step in the ITIL process where change records (Change object C1 818) have been issued for Problem P1 810 related to Incident I2 806 related to Resource R1 802, and a new resource (Resource R2 816) has also been identified related to Problem P1 810. Note that Problem objects P2 812 and P3 814 are not a part of the currently displayed process state for selected Problem object P1 810, although they remain in the list in the first display window for selection purposes.

Figure 8D:
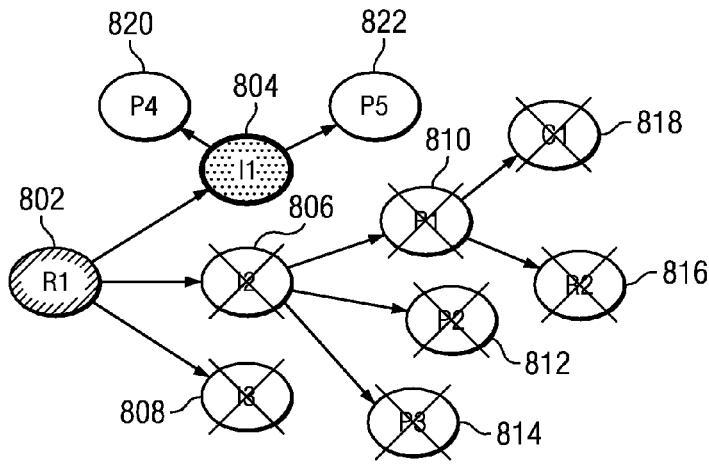

FIG. 8D illustrates a fourth step comprising selection of a different Incident related to Resource R1 802, such as Incident I1 804. Selection of Incident I1 804 displays the first state of objects and relationships related to Incident I1 804, and removes objects not related to Incident I1 804 from the display window. The diagram represents relationship changes as well as the transition from the process state in FIG. 8C to a new process state in FIG. 8D. The state in FIG. 8D represents a step in the ITIL process where problem records P4 820 and P5 822 have been issued for Incident I1 804 related to Resource R1 802, but change records have not yet been issued.

Figure 9:
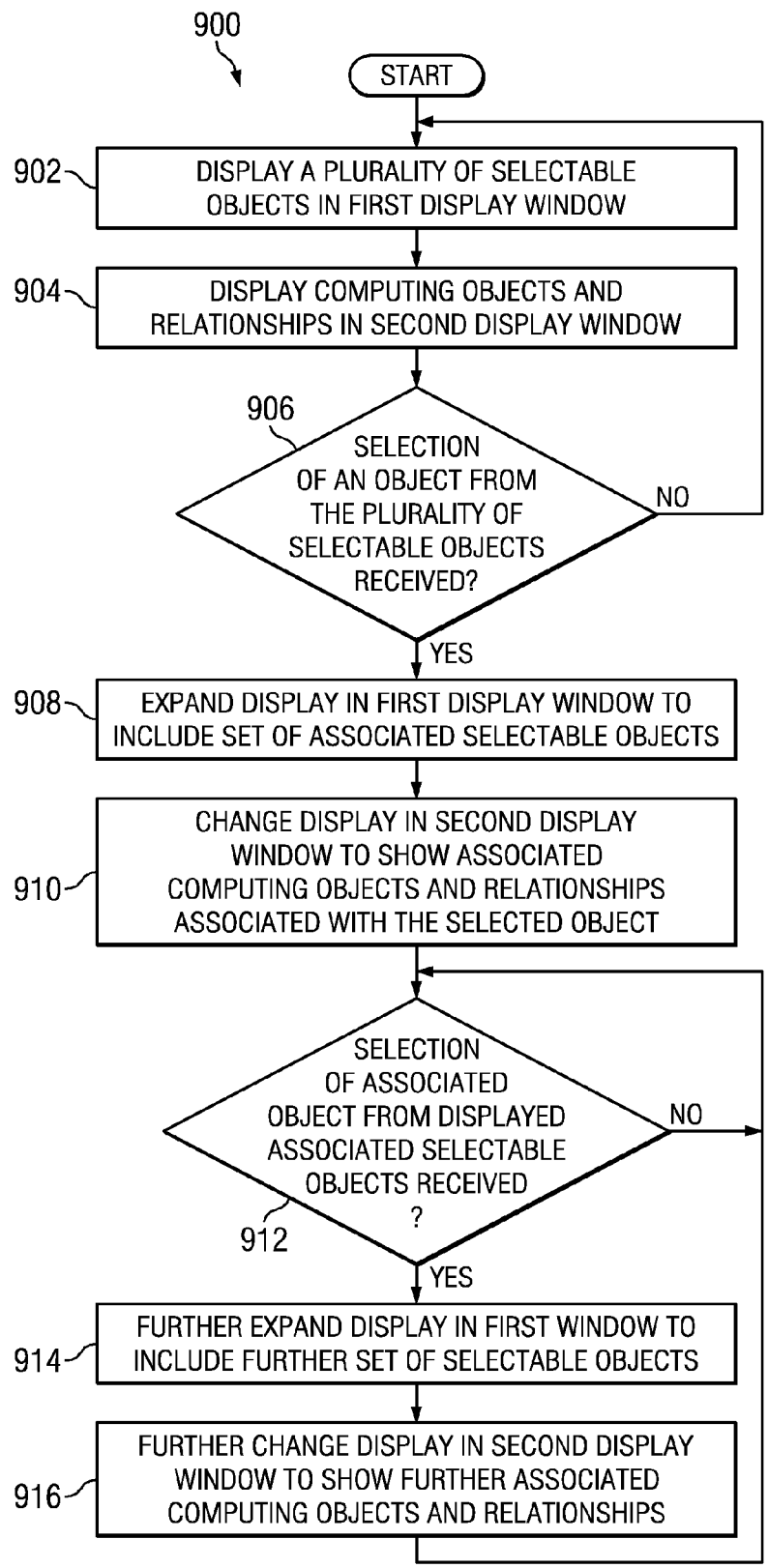
FIG. 9 is a flowchart that illustrates a method for displaying a graphical user interface for a distributed computing environment according to an illustrative embodiment.

FIG. 9 is a flowchart that illustrates a method for displaying a graphical user interface for a distributed computing environment according to an illustrative embodiment. The method is generally designated by reference number 900, and begins by displaying a plurality of objects in a first display window (Step 902), and displaying computing objects (for example, computing resources) and relationships between respective ones of the computing objects in a second display window (Step 904). The first and second display widows may be windows of a same display of a graphical user interface. The plurality of objects may comprise computing objects for selection, such as resources, incidents, problems, changes, or other events. A determination is made whether a selection of a displayed object of the plurality of objects displayed in the first display window is received (Step 906). Responsive to a determination that a selection has been received (Yes output of Step 906), the display in the first display window is expanded to include a set of associated selectable objects that is associated with the selected object (Step 908), and the display in the second display window is changed to show computing objects and relationships associated with the selected object (Step 910).

A determination is then made whether a selection of an associated object displayed in the expanded display in the first display window is received (Step 912). Responsive to determining that a selection of an associated object displayed in the expanded display in the first display window is received (Yes output of Step 912), the display in the first display window is further expanded to include a second set of selectable objects associated with the selected associated object (Step 914), and the display in the second display window is further changed to show the computing objects and relationships associated with the selected associated object (Step 916). The process then returns to Step 912 to enable the process to iteratively change the display in the second display window if it is determined that another selection of an associated object displayed in the expanded display in the first display window is received.

Returning to Step 906, if a selection of a displayed object of the plurality of computing objects displayed in the first window is not received (No output to Step 906), the process returns to Step 902. In a similar manner, if it is determined in Step 912 that a selection of an associated computing object displayed in the expanded display in the first window is not received (No output of Step 912), the process returns to Step 912.

Illustrative embodiments thus provide a computer implemented method, apparatus and computer program product for the selection and filtering of objects and relationships in a large enterprise environment. The mechanism is based on cumulative, step-wise addition of data that can visually accumulate as it passes from process state to process state. The illustrative embodiments may be applied to any model in which there is a statewise and cumulative process flow. The cumulative, statewise display of objects and relationships helps avoid display clutter and reduces the confusion that arises when all filtered objects and relationships are aggregated into one display.

The flowchart and block diagrams in the Figures illustrate the architecture, functionality, and operation of possible implementations of systems, methods and computer program products according to various embodiments of the disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the disclosure has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for iteratively displaying and changing a display in a graphical user interface for a distributed computing environment to navigate through states of an information technology management process, comprising:
    displaying computing objects and relationships between respective ones of the computing objects in the distributed computing environment in a graphical user interface on a computer, wherein a plurality of selectable objects are displayed in a display in a first display window of the graphical user interface, and the computing objects and relationships are displayed in a display in a second display window of the graphical user interface, and wherein a user navigates through states of an information technology management process displayed in the graphical user interface by selecting or deselecting the selectable objects in the first display window;
    responsive to selection of an object of the plurality of selectable objects displayed in the first display window, changing the display in the first display window to represent a first state of the information technology management process based on the selected object, wherein the first display window includes a first set of associated selectable objects associated with the selected object, and changing the display in the second display window to show the selected object and computing objects and relationships associated with the selected object; and
    responsive to selection of an associated selectable object of the first set of associated selectable objects, changing the display in the first display window to represent a transition to a second state of the information technology management process, wherein the first display window includes a second set of associated selectable objects associated with the selected associated object of the first set of associated objects and changing the display in the second display window to show the selected associated object and computing objects and relationships associated with the selected associated object of the first set of associated selectable objects.

2. The computer implemented method of claim 1, further comprising,
    responsive to selection of an associated selectable object of the second set of associated selectable objects, changing the display in the first display window to represent a transition to a third state of the information technology management process, wherein the first display window includes a third set of associated selectable objects associated with the selected associated object of the second set of associated objects, and changing the display in the second display window to show the selected associated object and computing objects and relationships associated with the selected associated object of the second set of associated selectable objects.

3. The computer implemented method of claim 1, further comprising:
    changing the display in the first display window each time selection of an associated selectable object of the second set of associated selectable objects is detected to reflect transitions between states of the information technology management process.

4. The computer implemented method of claim 1, wherein the computing objects comprise computing resources.

5. The computer implemented method of claim 1, wherein the plurality of selectable objects comprises a plurality of incidents, wherein the first set of associated selectable objects associated with the selected object comprises a set of problems, and wherein the second set of associated selectable objects associated with the selected associated object of the first set of associated selectable objects comprises a set of changes.

6. The computer implemented method of claim 1, wherein the plurality of selectable objects is displayed in the first window in response to selection of an application for diagnosis of performance problems.

7. The computer implemented method of claim 5, wherein each change made to the display in the second display window are cumulative but bounded within a context of the application and the selected object and selected associated object.

8. The computer implemented method of claim 1, wherein selection of a selectable object or selectable associated object results in removal of computing objects and relationships associated with the selected object or selected associated object from the second display window to reflect a transition to another state in the information technology management process.

9. An apparatus comprising:
    a bus;
    a storage device connected to the bus, wherein the storage device contains computer readable code; and a processing unit connected to the bus, wherein the processing unit executes the computer readable code to display computing objects and relationships between respective ones of the computing objects in the distributed computing environment, wherein a plurality of selectable objects are displayed in a display in a first display window of a graphical user interface, and the computing objects and relationships are displayed in a display in a second display window of the graphical user interface, and wherein a user navigates through states of an information technology management process displayed in the graphical user interface by selecting or deselecting the selectable objects in the first display window; change, in response to selection of an object of the plurality of selectable objects displayed in the first display window, the display in the first display to represent a first state of the information technology management process based on the selected object, wherein the first display window includes a first set of associated selectable objects associated with the selected object, and changing the display in the second display window to show the selected object and computing objects and relationships associated with the selected object; and change, in response to selection of an associated selectable object of the first set of associated selectable objects, the display in the first display window to represent a transition to a second state of the information technology management process, wherein the first display window includes a second set of associated selectable objects associated with the selected associated object of the first set of associated objects, and changing the display in the second display window to show the selected associated object and computing objects and relationships associated with the selected associated object of the first set of associated selectable objects.

10. The apparatus of claim 9, wherein the processing unit further executes the computer readable code to change, in response to selection of an associated object of the second set of associated selectable objects, the display in the second display window to represent a transition to a third state of the information technology management process, wherein the first display window includes a third set of associated selectable objects associated with the selected associated object of the second set of associated objects, and wherein change to the display in the second display window shows the selected associated object of the second set of associated selectable objects and computing objects and relationships associated with the selected associated object of the second set of associated selectable objects.

11. The apparatus of claim 9, wherein the plurality of selectable objects comprises a plurality of incidents, wherein the first set of associated selectable objects associated with the selected object comprises a set of problems, and wherein the second set of associated selectable objects associated with the selected associated object of the first set of associated selectable objects comprises a set of changes.

12. The apparatus of claim 9, wherein the plurality of selectable objects is displayed in the first window in response to selection of an application for diagnosis of performance problems, and wherein each change made to the display in the second display window are cumulative but bounded within a context of the application and the selected object and selected associated object.

13. A computer program product in a computer readable storage medium having computer readable program code stored thereon, the computer readable program code for execution by a computer, comprising:

computer readable program code for displaying computing objects and relationships between respective ones of the computing objects in the distributed computing environment in a graphical user interface on a computer, wherein a plurality of selectable objects are displayed in a display in a first display window of the graphical user interface, and the computing objects and relationships are displayed in a display in a second display window of the graphical user interface, and wherein a user navigates through states of an information technology management process displayed in the graphical user interface by selecting or deselecting the selectable objects in the first display window;

computer readable program code for changing, in response to selection of an object of the plurality of selectable objects displayed in the first display window, the display in the first display window to represent a first state of the information technology management process based on the selected object, wherein the first display window includes a first set of associated selectable objects associated with the selected object, and changing the display in the second display window to show the selected object and computing objects and relationships associated with the selected object; and computer readable program code for changing, in response to selection of an associated selectable object of the first set of associated selectable objects, the display in the first display window to represent a transition to a second state of the information technology management process, wherein the first display window includes a second set of associated selectable objects associated with the selected associated object of the first set of associated objects, and change the display in the second display window to show the selected associated object and computing objects and relationships associated with the selected associated object of the first set of associated selectable objects.

14. The computer program product of claim 13, further comprising, computer readable program code for changing, in response to selection of an associated object of the second set of associated selectable objects, the display in the first display window to represent a transition to a third state of the information technology management process, wherein the first display window includes a third set of associated selectable objects associated with the selected associated object of the second set of associated objects, and wherein the change to the display in the second display window shows the selected associated object and computing objects and relationships associated with the selected associated object of the second set of associated selectable objects.

15. The computer program product of claim 13, wherein the plurality of selectable objects comprises a plurality of incidents, wherein the first set of associated selectable objects associated with the selected object comprises a set of problems, and wherein the second set of associated selectable objects associated with the selected associated object of the first set of associated selectable objects comprises a set of changes.

16. The computer program product of claim 13, wherein the plurality of selectable objects is displayed in the first window in response to selection of an application for diagnosis of performance problems.

17. The computer program product of claim 16, wherein each change made to the display in the second display window are cumulative but bounded within a context of the application and the selected object and selected associated object.

18. The computer program product of claim 13, wherein selection of a selectable object or selectable associated object results in removal of computing objects and relationships associated with the selected object or selected associated object from the second display window.

19. The computer program product of claim 13, wherein the computer readable program code is stored in a computer readable storage medium in a data processing system, and wherein the computer readable program code is downloaded over a network from a remote data processing system.

20. The computer program product of claim 13, wherein the computer readable program code is stored in a computer readable storage medium in a server data processing system, and wherein the computer readable program code is downloaded over a network from a remote data processing system for use in a computer readable storage medium with the remote system.

* * * * *